[11] 3,621,913

[72] Inventor William B. Braden, Jr.
Houston, Tex.
[21] Appl. No. 887,373
[22] Filed Dec. 22, 1969
[45] Patented Nov. 23, 1971
[73] Assignee Texaco Inc.
New York, N.Y.

[54] METHOD OF TREATING CLAY-CONTAINING FORMATIONS
5 Claims, No Drawings

[52] U.S. Cl. ................................................ 166/272,
166/274, 166/305 R
[51] Int. Cl. .................................................. E21b 43/22,
E21b 43/24, E21b 43/25
[50] Field of Search .................................... 166/268,
272, 273, 274, 275, 305 R; 252/8.5 B, 8.5 C, 8.55 D; 210/51

[56] References Cited
UNITED STATES PATENTS

| | | | |
|---|---|---|---|
| 2,605,221 | 7/1952 | Hoeppel | 252/8.5 A |
| 3,131,759 | 5/1964 | Slusser et al. | 166/305 |
| 3,292,702 | 12/1966 | Boberg | 166/303 |

OTHER REFERENCES

Davis, " The Swelling of Bentonite and Its Control," Industrial and Engineering Chemistry, Vol. 19, No. 12, pp. 1350–1352, Dec. 1927

*Primary Examiner*—Stephen J. Novosad
*Attorneys*—Thomas H. Whaley, Carl G. Ries and James F. Young ABSTRACT: Method of treating underground formations containing clays to increase water permeability employing an aqueous solution of an aluminum salt.

METHOD OF TREATING CLAY-CONTAINING FORMATIONS

The present invention relates to the treatment of clay-containing formations. More particularly, this invention relates to a method of treating underground formations containing clays or claylike materials to increase the water permeability of clays which have been previously damaged by water so that their water permeability has been materially reduced.

It has now been found that a water-sensitive clay-containing formation can be effectively treated to improve the water and/or steam permeability of the clay with a prescribed class of aluminum salts in an aqueous solution. Treatment of underground clay-containing formations with an aqueous solution of an aluminum salt as hereinafter defined materially increases the water permeability of the treated clay and also assists in restoring the water permeability of previously water-damaged clay formations.

The prescribed class of water soluble aluminum salts include the aluminum halides such as aluminum bromide, aluminum chloride, aluminum fluoride, aluminum iodide, aluminum acetate, aluminum chlorate, aluminum citrate, aluminum formate, aluminum tartrate, aluminum nitrate, aluminum sulfate and the like.

The method of the present invention has particular applicability in secondary recovery operations wherein water flooding or steam injection is employed as the secondary driving force to recover the oil from the formation. In such a secondary recovery operation, for example, water flooding, the injection water is introduced into the formation through an injection well under pressure and forced out into the oil-containing formation. The pressure maintained on the water injected into the formation displaces or forces the oil to move toward the producing well which is located relatively distant from the injection well. At the producing well the driven oil is recovered by conventional means.

In carrying out the method of the present invention it has been found desirable to inject the prescribed class of aluminum salts in the solvent into the formation from the injection well and to maintain the injected treating solution in contact with the clayey portion of the underground formation for a period of time such as from about 1 to about 7 days to effect stabilization to the clay materials in contact with the treating solution. Thereafter the secondary recovery injection fluid can be introduced into the formation in a conventional manner which is well known in the art. If the permeability of the formation to the secondary recovery injection fluid is reduced as is evidenced by a reduction in the flow of oil from the producing well, the flow of secondary recovery injection fluid into the injection well is discontinued. There is introduced into the injection well the treating solution of the present invention in an amount sufficient to restore the permeability of the formation to the injection fluid. This restoration treatment is carried out in the same manner as described hereinabove. Subsequent to the restoration treatment the secondary recovery injection fluid flow into the injection well can be initiated again.

The concentration of the prescribed class of aluminum salts in the aqueous solvent can vary from about 0.2 percent up to about 3 percent by weight but for the most satisfactory results a concentration between about 0.4 percent and about 1 percent has been found to be most effective. Employment of the prescribed class of aluminum salts in a concentration of below about 0.2 percent is impractical since relatively large amounts of such a dilute treating solution would be required to bring the aluminum salt treating agent into contact with the clay in and about the injection well so as to increase the clay permeability. Concentrations above about 3 percent are impractical also as no improvement in permeability is attained by use of such concentrations. A preferred concentration for the preferred salt, aluminum chloride, is from about 0.4 percent to about 1.0 percent by weight.

Following is a description by way of example of the method of the present invention.

A water-sensitive Berea sandstone plug measuring 2.2 cm. in length and 2.2 cm. in diameter was mounted in a permeameter. The air permeability of the plug was found to be 50.3 millidarcies (md.). Its water permeability was 20.9 md. and its porosity was 16.9 percent. The pore volume of the plug was 1.41 cc.

EXAMPLE I

The plug was subjected to a number of injections of 100 cc. of aqueous treating solution each at an injection pressure of 5 p.s.i.g. each and the liquid permeability of the plug determined after each injection. The following table shows the concentration of each treating solution and the results of the permeability determinations.

TABLE I

PERCENT OF ORIGINAL PERMEABILITY

| Injection No. | % wt. $AlCl_3$ in solution | % original permeability (md.) |
|---|---|---|
| 1 | 0.6 | 100 |
| 2 | 0.3 | 101 |
| 3 | 0.15 | 94 |
| 4 | 0.075 | 95 |
| 5 | 0.0375 | 95 |
| 6 | 0.0188 | 94 |
| 7 | 0.0094 | 93.5 |
| 8 | 0.0047 | 90 |
| 9 | 0.00235 | 90 |
| 10 | 0.00118 | 86 |
| 11 | 0.00059 | 84 |

Following injection No. 11 the plug was injected with 200 cc. of 0.6 percent by weight aqueous aluminum chloride, followed by 100 cc. of 5 percent aqueous sodium chloride solution, followed by 100 cc. of 0.6 percent by weight aqueous aluminum chloride. The liquid permeability of the plug was found to be 77 percent of its original permeability (a decrease of only 7 percent from the plug's permeability after the 11th injection).

Another subsequent injection of 100 cc. of 0.00059 percent by weight aqueous aluminum chloride only resulted in a slight decrease in permeability to 74 percent of original permeability. A subsequent injection of 100 ml. of distilled water resulted in a slight decrease in permeability of the plug to 73 percent, a loss of only 1 percent.

COMPARATIVE EXAMPLE A

Another plug of similar size having a pore volume of 1.42 cc. from the same Berea sandstone was found to have an air permeability of 55.9 md., a water permeability of 33.6 md., and a porosity of 17.0 percent. This plug was subjected to successive injections of 100 cc. of aqueous sodium chloride and the permeability determined after each injection.

The results are shown in the following Table II.

TABLE II

| Injection No. | % wt. aq. NaCl in solution | % of original permeability (md.) |
|---|---|---|
| 1 | 2.5 | 94 |
| 2 | 1.25 | 97 |
| 3 | 0.625 | 90 |
| 4 | 0.313 | 87 |
| 5 | 0.15 | 77 |
| 6 | 0.075 | 69 |

Thereafter the plug was treated by injection of 100 cc. of 5 percent by weight aqueous sodium chloride solution. The permeability was found to be 68 percent of original permeability. After a subsequent injection of 90 cc. of 0.075 by weight aqueous sodium chloride the permeability had decreased to 62 percent of its original permeability, a loss of 6 percent. After subsequent injection of only 15 cc. of the distilled water the plug was found to have a permeability of only 1 percent of its original permeability.

EXAMPLE II

Another series of tests was conducted to determine the effect of aluminum salts as, for example, aluminum chloride on the swelling of water clay formations. Solutions of aluminum chloride of varying concentrations were prepared. A portion of each solution was taken and introduce into a 100 ml. centrifuge tube containing 4 grams of "Macogel" clay, essentially a montmorillonite clay. The total amount of clay and treating solution in the tube amounted to 100 ml. in volume. Thereafter the sample tubes were centrifuged for 20 minutes at a speed of 1,400 r.p.m. The liquid was decanted and the volume occupied by the treated clay observed.

The test results are recorded in the following table.

TABLE III

| Strength of Treating Solution wt. % $AlCl_3$ | Clay volume cc. (after centrifuging) |
|---|---|
| 10 | 28.0 |
| 8 | 23.5 |
| 6 | 19.0 |
| 5 | 17.0 |
| 4 | 15.5 |
| 3 | 14.0 |
| 2 | 12.5 |
| 1 | 10.7 |
| 0.9 | 10.5 |
| 0.8 | 10.4 |
| 0.6 | 10.2 |
| 0.5 | 10.0 |
| 0.4 | 10.7 |
| 0.2 | 14.0 |
| 0.0 | 100.00 |

The data in the above table show that use of aluminum chloride in aqueous solution at the preferred concentration of 0.4 percent to 1 percent weight was most effective in reducing the tendency of the clay to swell during the initial contact.

The table also shows that increasing the treating concentration above 3 percent by weight had no beneficial effect and that at concentrations of less than 0.2 percent by weight, adverse effects were generally found.

Following the procedure of example II above, another series of tests was conducted to determine the effect of sodium chloride on the swelling of water sensitive clay formations.

The test results are set forth in table IV below.

TABLE IV

| Strength of Treating Solution Wt. % NaCl | Clay volume cc. (after centrifuging) |
|---|---|
| 10.0 | 15.5 |
| 8.0 | 16.5 |
| 6.0 | 20.0 |
| 5.0 | 23.0 |
| 4.0 | 32.0 |
| 3.0 | 46.0 |
| 2.0 | 82.0 |
| 1.0 | 86.0 |
| 0.9 | 86.5 |
| 0.8 | 86.5 |
| 0.6 | 86.5 |
| 0.5 | 87.0 |
| 0.4 | 88.0 |
| 0.2 | 91.5 |
| 0.0 | 100.0 |

The data in table Iv above show that sodium chloride was ineffective in preventing the swelling of water-sensitive clay at almost all concentrations, and particularly at the low concentrations in applicant's range.

Obviously, many modifications and variations of the invention as hereinbefore set forth may be made without departing from the spirit and therefore only such limitations should be made as are indicated in the appended claims.

I claim:

1. A method of treating a water-sensitive clay-containing formation to improve the water permeability of said clay which comprises contacting said clay with aluminum chloride in aqueous solution in an amount in the range of from about 0.2 to about 3 percent by weight.

2. A method as claimed in claim 1 wherein said clay containing formation is adjacent to a well bore.

3. A method as claimed in claim 1 wherein the concentration of aluminum chloride in the aqueous solution is in the range of from about 0.4 percent to about 1 percent by weight.

4. A method of recovering oil from an oil bearing underground formation containing water-sensitive clay wherein a displacement fluid selected from the group consisting of water, steam and mixtures thereof is applied to said formation and oil is recovered therefrom which comprises introducing a treating solution consisting of from about 0.2 to about 3 percent by weight of aluminum chloride in an aqueous solution into said formation, contacting said clay with said treating solution to improve the water permeability of said clay, and thereafter introducing said displacement fluid into said formation under pressure to force said treating solution through the formation and recovering oil from said formation.

5. A method as claimed in claim 4, wherein the concentration of aluminum chloride in the aqueous solution is in the range of from about 0.4 percent to about 1 percent by weight.

* * * * *

PO-1050
(5/69)

UNITED STATES PATENT OFFICE
CERTIFICATE OF CORRECTION

Patent No. 3,621,913                    Dated  November 23, 1971

Inventor(s) William B. Braden, Jr.

It is certified that error appears in the above-identified patent and that said Letters Patent are hereby corrected as shown below:

Col. 3, line 11     After "water" insert --sensitive--

Col. 3, after line 51   Insert in center of page --COMPARATIVE EXAMPLE B--

Signed and sealed this 20th day of June 1972.

(SEAL)
Attest:

EDWARD M. FLETCHER, JR.                ROBERT GOTTSCHALK
Attesting Officer                      Commissioner of Patents